United States Patent
Lewandowski et al.

(10) Patent No.: US 6,783,358 B1
(45) Date of Patent: Aug. 31, 2004

(54) FURNACE AND METHOD FOR HEATING COATED GLASS SHEETS

(75) Inventors: Troy R. Lewandowski, Maumee, OH (US); Donivan M. Shetterly, Rudolph, OH (US)

(73) Assignee: Glasstech, Inc., Perrysburg, OH (US)

( * ) Notice: Subject to any disclaimer, the term of this patent is extended or adjusted under 35 U.S.C. 154(b) by 0 days.

(21) Appl. No.: 10/447,052

(22) Filed: May 28, 2003

(51) Int. Cl.⁷ .................................................. F27B 9/00
(52) U.S. Cl. ........................ 432/144; 432/145; 432/148; 65/273; 65/274
(58) Field of Search .................................. 432/144, 145, 432/148, 143; 65/273, 274, 29.1, 29.19, 162, 163, 160, 349, 350, 356, DIG. 4; 219/470, 388

(56) References Cited

U.S. PATENT DOCUMENTS

| | | |
|---|---|---|
| 3,806,312 A | 4/1974 | McMaster et al. |
| 3,934,970 A | 1/1976 | McMaster et al. |
| 3,947,242 A | 3/1976 | McMaster et al. |
| 3,994,711 A | 11/1976 | McMaster |
| 4,505,671 A | 3/1985 | McMaster |
| 4,529,380 A | 7/1985 | McMaster |
| 4,738,705 A | 4/1988 | McMaster |
| 5,669,954 A | 9/1997 | Kormanyos |
| 5,672,191 A | 9/1997 | Kormanyos |
| 5,735,924 A | 4/1998 | Kormanyos |
| 5,762,677 A | 6/1998 | Kormanyos |
| 5,792,232 A | 8/1998 | Kormanyos |
| 6,131,411 A | 10/2000 | Schnabel, Jr. |
| 6,279,349 B1 | 8/2001 | Schnabel, Jr. |
| 6,470,711 B1 * | 10/2002 | Jarvinen et al. ............... 65/273 |

FOREIGN PATENT DOCUMENTS

WO    WO 98/01398    *  1/1998

* cited by examiner

*Primary Examiner*—Jiping Lu
(74) *Attorney, Agent, or Firm*—Brooks Kushman P.C.

(57) ABSTRACT

A furnace (12) and a method for heating coated glass sheets by radiant heating also provides convective heating by hot air jets that entrain hot air within the furnace so the combined flow of hot air heats an upwardly facing coated glass surface in addition to the radiant heating, and a control (89) increases this convective heating during the conveyance to balance the heating and the resultant temperature of the upwardly facing coated surface and a downwardly facing uncoated surface of each conveyed glass sheet. A hot air distributing system (86) includes an array (90) of hot air distributors (92) constructed to effectively supply the convective heating. The hot air distributors (92) have heat exchangers (96) that heat pressurized air that provides the hot air jets. The furnace (12) conveys the glass sheets either in an oscillating manner or a continuous one direction manner during the heating.

20 Claims, 5 Drawing Sheets

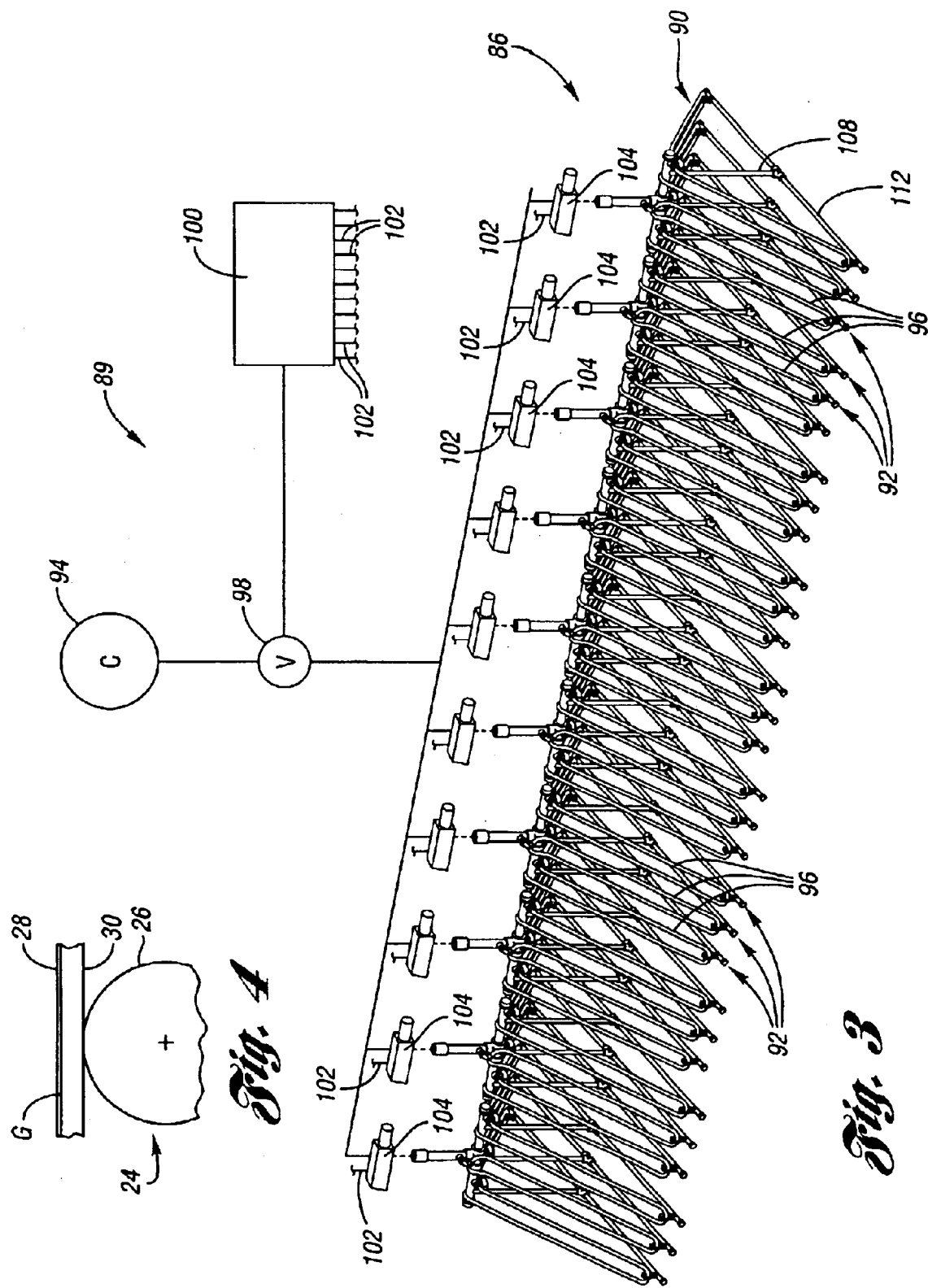

FURNACE AND METHOD FOR HEATING COATED GLASS SHEETS

BACKGROUND OF THE INVENTION

1. Field of the Invention

This invention relates to a furnace and method for heating glass sheets that each have a coated surface and an oppositely facing uncoated surface.

2. Background Art

Glass sheets are heated for processing such as forming, quenching for heat strengthening or tempering, or forming and quenching, etc. Such heating is conventionally performed by either electric resistance-type furnaces or by forced convection furnaces utilizing gas burners. Prior electric resistance-type furnaces are disclosed by U.S. Pat. No. 3,934,970 McMaster et al., U.S. Pat. No. 3,947,242 McMaster et al., and U.S. Pat. No. 3,994,711 McMaster, all of which have lower and upper housing portions that support electric resistance elements that provide radiant heating of glass sheets from below and above at their lower and upper surfaces during conveyance within a heating chamber of the furnace housing. Prior gas burner type forced convection furnaces are disclosed by U.S. Pat. No. 4,738,705 McMaster and by the U.S. patents of Kenneth R. Kormanyos: U.S. Pat. Nos. 5,669,954; 5,672,191; 5,735,924; 5,762,677; and 5,792,232, all of which have lower and upper gas burner type forced convection heaters that provide forced convection heating of conveyed glass sheets from below and above at lower and upper surfaces of the glass sheets. The U.S. Pat. No. 6,131,411 Schnabel, Jr. and U.S. Pat. No. 6,279,349 Schnabel, Jr. disclose a glass sheet heating furnace having a lower housing portion including electric resistant heating and an upper housing portion including gas burner type forced convection heating.

Air jets provided by compressed air have also previously been used to entrain heated air within a furnace to provide glass sheet heating. Such air jets are disclosed in U.S. Pat. No. 4,505,671 at the exit end of an electric resistant type furnace to provide planarity of the heated glass sheets. Also, U.S. Pat. No. 4,529,380 McMaster discloses such air jets, which are heated by an external heater to provide the primary source for heating the furnace.

Electric resistance furnaces for heating glass sheets are less expensive to manufacture than gas burner type forced convection furnaces and also can be more easily controlled by less involved control apparatus. In addition, electric resistance furnaces for heating glass sheets also result in a greater percentage of the energy input being transferred into the glass for the heating. However, electrical energy is more expensive than natural gas heating and the radiant heating involved cannot efficiently heat low-emissivity coated glass sheets. In fact, some reflective coatings reflect over 90% of incident radiant heat which makes it virtually impossible to efficiently heat such glass sheets by radiant heat with electric resistance-type furnaces.

SUMMARY OF THE INVENTION

An object of the present invention is to provide an improved furnace for heating coated glass sheets.

In carrying out the above object, the furnace of the invention heats glass sheets that each have a coated surface and oppositely facing uncoated surface. A housing of the furnace defines a heating chamber an d h as entrance and exit ends, and a roll conveyor of the furnace conveys glass sheets to be heated within the heating chamber along a horizontal conveying plane between the entrance and exit ends of the furnace with the coated surface facing upwardly and with the uncoated surface facing downwardly and supported by the roll conveyor. Electric resistance elements of the furnace heat the housing within the heating chamber below and above the conveying plane. A hot air distributing system of the furnace is located within the heating chamber between the entrance and exit ends above the roll conveyor and supplies hot air jets downwardly toward the upwardly facing coated glass surface of each conveyed glass sheet. These hot air jets also entrain hot air within the heating chamber and the combined flow of hot air provides convective heating of the coated glass surface in addition to the radiant heating thereof by the electric resistance elements. A control of the furnace increases the forced convection heating of the glass sheet by the hot air distributing system during the glass sheet conveyance to balance the heating and the resultant temperature of the upwardly facing coated surface and the downwardly facing uncoated surface of each conveyed glass sheet being heated.

The hot air distributing system includes an array of hot air distributors positioned above the roll conveyor between the entrance and exit ends of the furnace. A source of pressurized air is located outside of the furnace and supplies pressurized air to the hot air distributors. The hot air distributors include heat exchangers for heating the pressurized air prior to delivery therefrom as the downwardly directed hot air jets.

The furnace also includes a controller for terminating the supply of pressurized air to the hot air distributors below which there is no glass sheet being conveyed so as to thereby provide efficiency in the heating.

Each hot air distributor includes an upper manifold and a vertical support tube having an upper end that is supported by the upper manifold extending downwardly therefrom without direct fluid communication with the upper manifold. The support tube has a lower end adjacent the roll conveyor, and each hot air distributor also includes a horizontal delivery tube that extends in opposite directions from the lower end of the supply tube in fluid communication therewith and has downwardly opening delivery orifices. The heat exchanger of each hot air distributor includes a heat exchanger tube having an inlet that is fed pressurized air and an outlet through which pressurized air heated within the heat exchanger tube is fed to the vertical support tube for flow to the horizontal delivery tube and delivery through the orifices thereof as the downwardly directed hot air jets that entrain hot air within the heating chamber and provide convective heating to the upwardly facing coated glass surface of each conveyed glass sheet. The horizontal delivery tube has a pair of opposite lateral ends, and the heat exchanger tube has inclined portions that extend with an inverted V shape between the upper supply tube and the pair of opposite lateral ends of the horizontal delivery tube. More specifically, the heat exchanger tube includes a pair of inclined portions that extend with an inverted V shape between the upper supply tube and the pair of opposite lateral ends of the horizontal delivery tube, and the upper supply tube has a vertical portion that depends downwardly from the furnace housing and a horizontal portion that extends horizontally from the vertical portion thereof with each supply tube supporting a plurality of the hot air distributors.

In one construction of the hot air distribution system, each hot air distributor includes a pair of inclined supports having upper ends connected to the upper manifold and having lower ends connected to the horizontal delivery tube in an inverted V shape that provides support to the delivery tube. This embodiment also includes support brackets that connect adjacent hot air distributors at the lower ends of their inclined supports. These brackets have upper connectors, and the furnace housing has downwardly extending roof supports that support the upper connectors of the brackets which thereby cooperate in supporting the delivery tubes of the hot air distributors.

In two different embodiments of the furnace disclosed, the roll conveyor includes a drive that provides rotary driving of the conveyor. In one embodiment, the rotary driving is provided in opposite directions to provide oscillation of each glass sheet being heated during conveyance thereof in opposite directions between the entrance and exit ends of the furnace. In another embodiment, the drive provides rotary driving the conveyor in one direction to provide conveyance of each glass sheet in one direction from the entrance end of the furnace to its exit end.

The furnace is constructed with its housing including a lower portion having a flat floor and vertical side walls having upper ends, and the housing also includes an upper portion of a downwardly opening semicircular shape having lower ends located above the upper ends of the vertical side walls of the lower housing portion such that the housing portions cooperate to define the heating chamber. The electric resistance elements are mounted within the heating chamber on the lower housing portion floor below the roll conveyor and on the semicircular upper housing portion above the conveyor. The upper ends of the vertical side walls of the lower housing portion and the lower ends of the semicircular upper housing portion cooperate to define side slots, and the roll conveyor includes rolls having ends that project outwardly through the side slots of the furnace housing. Heat seals of the furnace seal between the lower housing vertical wall upper ends, the semicircular upper housing lower ends and the rolls to reduce heat loss from the heating chamber. The previously mentioned drive rotatively drives the roll ends externally of the heating chamber.

Another object of the present invention is to provide an improved method for heating glass sheets that each have a coated surface and an oppositely facing uncoated surface.

In carrying out the above objects, the method for heating coated glass sheets in accordance with the invention is performed by conveying each glass sheet on a roll conveyor along a horizontal conveying plane within a heating chamber of a housing between entrance and exit ends thereof with the coated surface thereof facing upwardly and with the uncoated surface thereof facing downwardly. Resistance elements are electrically heated at locations below and above the conveying plane to provide radiant heat to both the downwardly facing uncoated surface and the upwardly facing coated surface of each conveyed glass sheet. Hot air jets are supplied downwardly toward the upwardly facing coated glass surface of each conveyed glass sheet. The hot air jets entrain hot air within the heating chamber and the combined flow of hot air provides forced convection heating of the coated glass sheet in addition to the radiant heating thereof by the electric resistance elements. The forced convection heating by the downwardly directed hot air jets is increased during the glass sheet conveyance to balance the heat supplied thereto and the resultant temperature of the upwardly facing coated surface and the downwardly facing uncoated surface of each conveyed glass sheet being heated.

The hot air jets are supplied downwardly through an array of hot air distributors between the entrance and exit ends of the furnace with the hot air jet supply being terminated at the hot air distributors when there is no conveyed glass sheet below those distributors on the roll conveyor in order to provide efficiency in the heating.

The roll conveyor is rotatively driven to provide the glass sheet conveyance. In one practice, the rotational driving of the roll conveyor is in opposite directions to convey the coated glass sheet in an oscillating manner between the entrance and exit ends of the furnace for the heating. In another practice, the roll conveyor is rotatively driven in one direction to convey each coated glass sheet from the entrance end of the housing to its exit ends in a manner that is utilized for higher production glass sheet processing.

The objects, features and advantages and advantages of the present invention are readily apparent from the following detailed description of the preferred embodiments of the invention when taken in connection with the accompanying drawings.

BRIEF DESCRIPTION OF THE DRAWINGS

FIG. 3 is a perspective and partially schematic view of a hot air distributing system that provides convective heating to the upper coated surface of a coated glass sheet conveyed on a roll conveyor of the furnace.

FIG. 4 is a partial view taken in the same direction as FIG. 1 to illustrate the manner in which coated glass sheets are conveyed on the roll conveyor with a coated surface thereof facing upwardly and an uncoated surface thereof facing downwardly and supported by rolls of the conveyor.

DETAILED DESCRIPTION OF THE PREFERRED EMBODIMENTS

Figure 1:
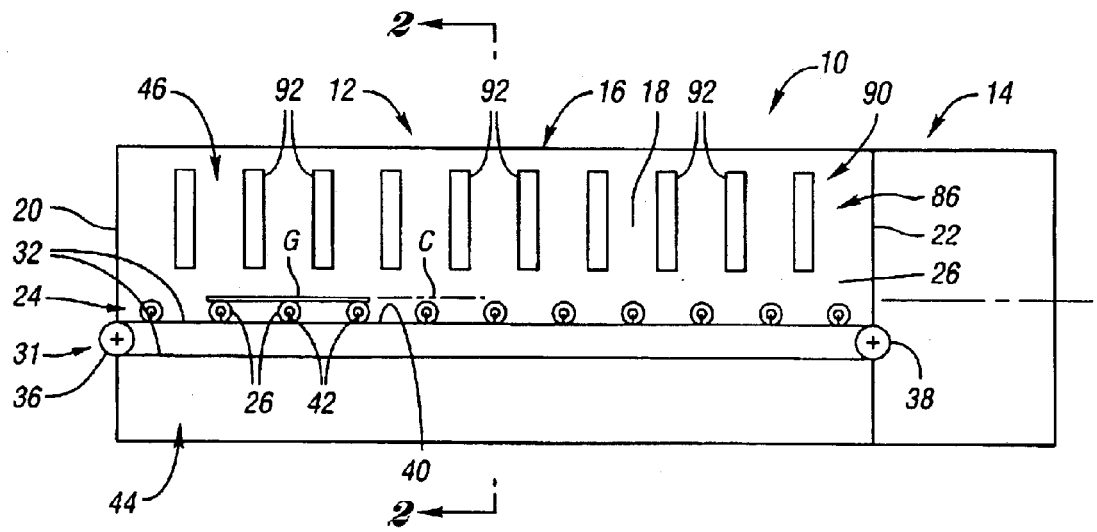
FIG. 1 is a side elevational view of one embodiment of a glass processing system including a furnace constructed in accordance with the invention to perform the coated glass sheet heating method of the invention.

With reference to FIG. 1 of the drawings, a glass sheet processing system generally indicated by 10 includes a heating furnace 12 constructed in accordance with the present invention to heat coated glass sheets G, and the system also includes a processing station 14 for processing the heated glass sheets to provide forming, quenching for heat strengthening or tempering, or forming and quenching, etc. The method for heating coated glass sheets in accordance with the invention is performed within the furnace 12 to heat coated glass sheets G from an ambient temperature to a sufficiently high temperature for the processing to be performed. Both the furnace 12 and the coated glass sheet heating method will be described in an integrated manner to facilitate an understanding of all aspects of the invention.

Figure 2:
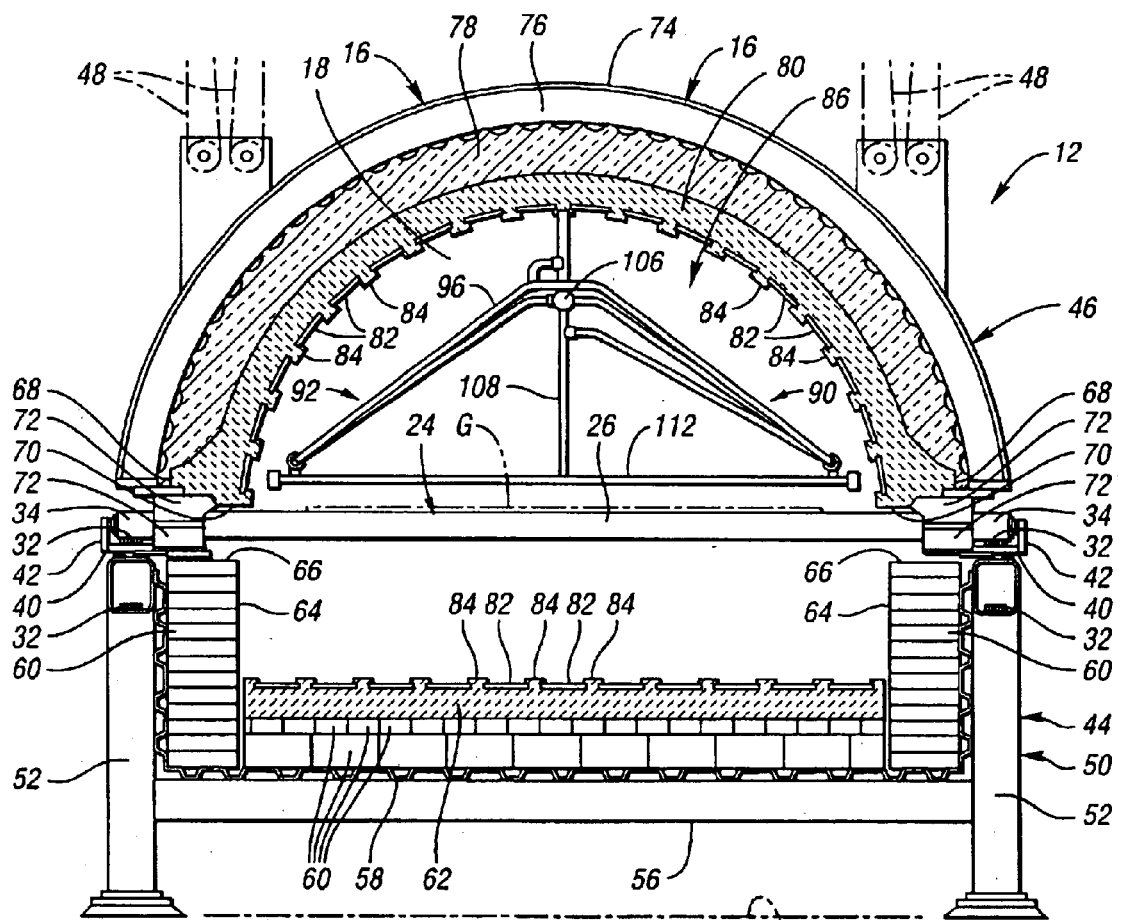
FIG. 2 is a cross sectional view taken through the furnace along the direction of line 2—2 in FIG. 1.

Furnace 12 as illustrated in FIGS. 1 and 2 includes an insulated housing 16 that defines a heating chamber 18 in which the coated glass sheets G are heated. This housing 16 as shown in FIG. 1 has a somewhat elongated construction including a left entrance end 20 where the glass sheets are introduced for the heating and a right exit end 22 where the heated glass sheets are delivered to the processing station 14. It should be appreciated that many types of the processing performed within the station 14 can be at a hot temperature so that there is essentially a continuous heated chamber between the furnace 12 and the processing station 14. Within the heating chamber, the furnace 12 includes a roll conveyor 24 having rolls 26 for conveying the glass sheets to be heated along a horizontal conveying plane C between the entrance and exit ends 20 and 22 with the coated glass sheet surface 28 facing upwardly as shown in FIG. 4 and with an uncoated surface 30 facing downwardly and supported by the roll conveyor 24 on its rolls 26.

Roll conveyor 24 of the furnace 12 illustrated in FIGS. 1 and 2 is preferably of the type disclosed by U.S. Pat. Nos. 3,806,312; 3,934,970 and 3,994,711 wherein a rotary drive 31 of the conveyor includes a pair of continuous drive loops 32 that respectively support and frictionally drive the opposite ends 34 of the conveyor rolls 26. Drive loops 32 are preferably embodied as toothed chains of the link type connected by pins and are received by associated toothed wheels 36 and 38 adjacent the entrance and exit ends 20 and 22 of the furnace housing at each of its lateral sides. Driving of these tooths wheels 36 and 38 slidably moves an upper reach of each drive loop 32 over an associated support surface 40 located outside of the furnace housing heating chamber 18 at the adjacent lateral side of the furnace. Roll positioners 42 project upwardly from the support surfaces 40 and capture central pins of the roll ends such that movement of the drive loops frictionally drives the roll ends to provide rotation of rolls 26 and consequent conveyance of the glass sheet G supported by the rolls within the heating chamber 18. The rolls 26 are made of sinter bonded fused silica particles so as to be resistant to thermal warpage. With this embodiment, the rotary drive 31 drives the conveyor rolls 26 in opposite directions as the glass sheets are conveyed within the heating chamber 18 in an oscillating manner between the entrance and exit ends 20 and 22 of the furnace housing.

The furnace housing 16 as illustrated in FIG. 2 includes a fixed lower housing portion 44 and a vertically movable upper housing 46 supported by counterbalanced chains 48 so as to permit access to the interior of the furnace by upward movement. A framework 50 of the lower housing portion 44 has legs 52 supported on the factory floor 54 and had horizontal beams 56 that support a corrugated metal liner 58 which in turn supports ceramic blocks 60 which support an insulated floor 62 and define vertical side walls 64 having upper ends 66. The upper housing portion 46 has a downwardly opening semicircular shape having lower ends 68 that cooperate with the upper ends 66 of the lower housing side walls 64 to define side slots 70 through which the conveyor roll ends 34 project outwardly from the heating chamber. Heat seals 72 seal in the side slots 70 between the lower housing vertical wall upper ends 66, the upper housing lower ends 68 and the rolls 26 at their ends 34 to reduce heat loss from the furnace. The drive loops 32 and toothed wheels 36 and 38 thus provide rotary driving of the conveyor roll ends 34 externally of the heating chamber so as to facilitate their operation. Also, the upper housing portion 46 has an outer semicircular metal skin 74 supported on a generally semicircular metal frame 76, and outer and inner semicircular ceramic blocks 78 and 80 are located within the frame 76.

With continuing reference to FIG. 2, electric resistance elements 82 for heating the furnace housing 16 are located within the heating chamber 18 both below and above the roll conveyor 24. More specifically, the lower housing portion 44 has its floor 62 provided with T-shaped retainers 84 that secure the electric resistance elements 82. Sometimes the electric resistance elements are also mounted on the lower side walls provided by blocks 60. Furthermore, the inner downwardly opening semicircular ceramic block 80 of the upper housing portion 46 has T-shaped retainers 84 that secure its electric resistance elements 82 above the roll conveyor 24.

With the furnace construction defined above, much of the radiant heating of the lower uncoated surface 30 of the glass sheet is provided by radiation from the hot conveyor rolls 26 as well as some conduction from the conveyor rolls in addition to natural convection. The semicircular construction of the upper housing portion 46 provides a more uniform radiant heating of the upper surface of the conveyed glass sheet G than is possible with a downward opening housing portion having right angle corners. However, the coating of the upper glass surface 28 is normally reflective such that most of the radiant energy is reflected and does not heat the upper glass surface.

As illustrated schematically in FIG. 1 and further illustrated in FIGS. 2 and 3, the furnace also includes a hot air distributing system 86 that is located within the furnace heating chamber 18 between the entrance and exit ends 20 and 22 above the roll conveyor 24 and supplies hot air jets 88 (FIG. 6) downwardly toward the upwardly facing coated glass surface of each conveyed glass sheet. These hot air jets 88 entrain hot air within the heating chamber such that the combined flow of hot air provides convective heating to the coated surface in addition to the radiant heating thereof by the electric resistance elements 82. The hot air jets entrain a large amount of hot air within the furnace, perhaps 10 to 20 times the mass flow of the jets, such that substantial forced convection heating results. Since most glass sheet coatings are more reflective than uncoated glass surfaces, the additional forced convective heating of the upper surface counterbalances the radiant heating of the uncoated lower surface which absorbs the radiant energy as opposed to reflecting it. A control collectively indicated by 89 in FIG. 3 increases the forced convection heating of the glass sheet by the hot air distributing system 86 during the glass sheet conveyance to balance the heating and resultant temperature of the upwardly facing coated surface 28 shown in FIG. 4 and the downwardly facing uncoated surface 30 of each conveyed glass sheet being heated. As the temperature of the glass is increased during the heating, the radiant heating of the lower uncoated surface 30, which largely absorbs the radiation, increases by the fourth power of the difference between the furnace temperature and the glass temperature; however, the temperature of the upper reflective coated surface 28, which largely reflects radiation, requires that the forced convection heating be increased in order to counterbalance the greater radiant heating of the lower surface. Thus, the increase of the convective heating of the upper coated surface 28 provides the balancing required so that both surfaces are heated at the same rate and have the same temperature so the glass remains planar during its heating. This increase in the convective heating is at an increasing rate over time and is controlled by the total mass flow of pressurized air supplied through the hot air distributing system to provide the hot air jets that also entrain the hot air within the furnace heating chamber.

As illustrated in FIG. 3, the hot air distributing system 86 includes an array 90 of hot air distributors 92 positioned above the roll conveyor as shown in FIG. 2 between the entrance and exit ends of the furnace. A source of pressurized air 94 shown in FIG. 3 will normally be a compressor located outside the furnace and supplies pressurized air to the hot air distributors 92. Furthermore, the hot air distributors 92 include heat exchangers 96 for heating the pressurized air prior to delivery therefrom as the downwardly directed hot air jets 88 shown in FIG. 6. With this heat exchanger 96 as is hereinafter more fully described, the hot air jets 88 are supplied at a temperature only slightly less than the furnace ambient air temperature. For example, if the air in the furnace heating chamber is about 700° C., the hot air jets will be only about 20 to 40° C. lower, i.e., about 660 to 680° C.

As shown in FIG. 3, the control 89 includes a valve 98 through which the pressurized air is supplied from the source 94 to the array 90 of hot air distributors 92. A controller 100 of control 89 operates the valve 98 to provide control of the air pressure supplied to the hot air distributors 92 and thereby provide the pressure that supplies the necessary mass flow to achieve the increased convective heating as previously described. Controller 100 also has connections 102 to solenoid operated shutoff valves 104 that each control the air flow to particular hot air distributors 92. More specifically as illustrated, each solenoid valve 104 controls the flow of the pressurized air from the control valve 98 to three of the hot air distributors 92. This controller 100 is coupled with the conveyor and suitable sensors to provide the downwardly directed hot air jets only where there is a coated glass sheet being conveyed. Thus, after the coated glass sheet passes each set of hot air distributors 92, its associated valve 104 terminates the flow of hot air so as to thus provide efficiency in the convective heating supplied by the hot air distributing system 86. With the embodiment of FIG. 1 wherein the coated glass sheet G being heated is oscillated between the entrance and exit ends 20 and 22 of the furnace housing 16, the location where the downwardly directed hot air jets are supplied thus moves back and forth with the conveyed glass sheet and the mass flow thereof is increased during the heating by operation of the control valve 98 shown in FIG. 3 so as to provide the balancing of the total heat supplied to the upper coated surface 38 and the lower uncoated surface 30 illustrated in FIG. 4.

Figure 5:
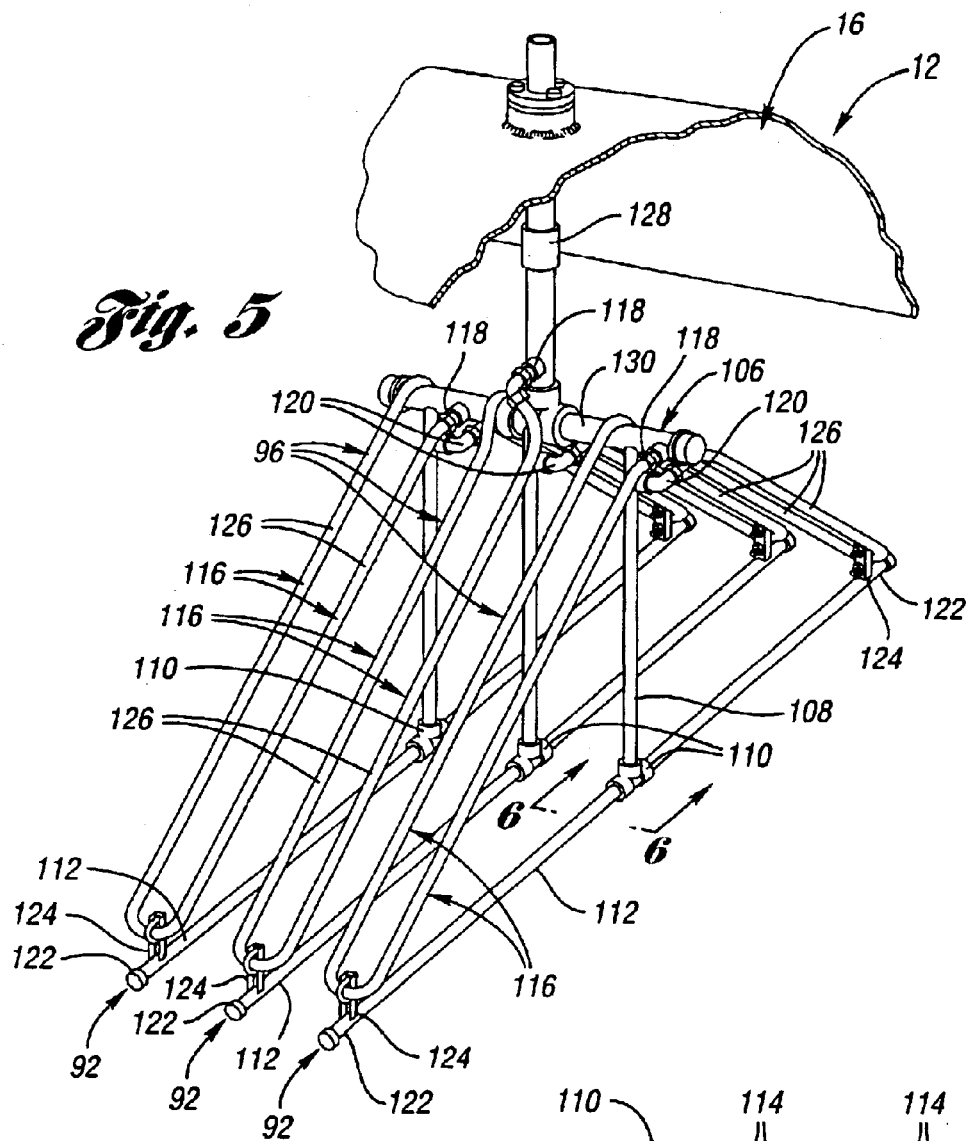
FIG. 5 is a partial perspective view taken in the same direction but on an enlarged scale from FIG. 3 to further illustrate the construction of hot air distributors of the hot air distributing system utilized to provide the convective heating.
Figure 6:
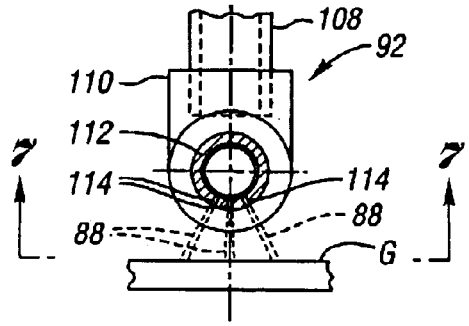
FIG. 6 is a partial sectional view taken along the direction of line 6—6 in FIG. 5 to illustrate a horizontal delivery tube and a vertical support tube.
Figure 7:
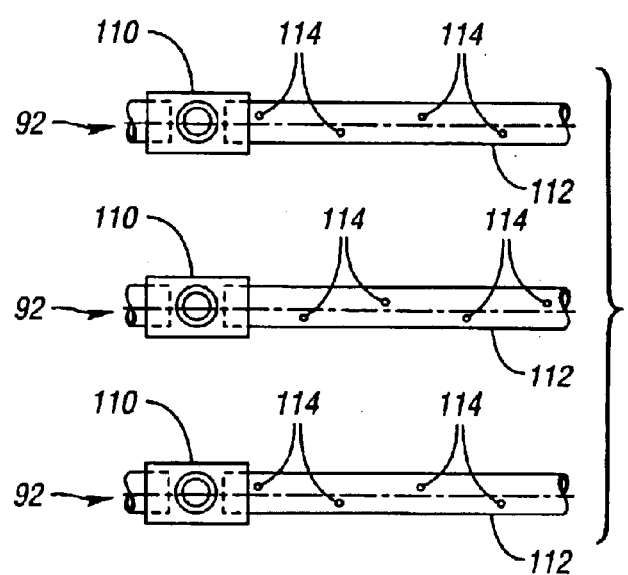
FIG. 7 is a bottom plan view taken in the direction of line 7—7 in FIG. 6 and illustrates the manner in which an array of the hot air distributors have staggered delivery orifices for delivering the downwardly directed convective heating.

With reference to FIG. 5, each hot air distributor 92 includes an upper manifold 106 and a vertical support tube 108 having an upper end that is supported by the upper manifold 106 extending downwardly therefrom without direct fluid communication therewith at its upper end. The vertical support tube also has a lower end adjacent the conveyor and is received by a T fitting 110. A horizontal delivery tube 112 of each hot air distributor 92 extends in opposite directions from the lower end of the support tube 108 and is communicated therewith through the T fitting 110. The deliver tube 112 as shown in FIG. 6 has downwardly directed orifices 114. The delivery orifices 114 are provided in sets that are vertical and inclined in opposite directions from the vertical by an angle α of about 30°. As shown in FIG. 7, the delivery orifices 114 of adjacent hot air distributors are staggered laterally with respect to the direction of conveyance so as to prevent strip heating of the coated glass sheet.

As best illustrated in FIG. 5, the heat exchanger 96 of each hot air distributor 92 includes a heat exchanger tube 116 having an inlet 118 that is fed pressurized air through the upper manifold 106 and an outlet 120 through which pressurized air heated within the heat exchanger tube is fed to the vertical support tube 108 for downward flow to the horizontal delivery tube 112 and delivery through the orifices 114 thereof as the downwardly directed hot air jets that also entrain hot air in the heating chamber such that the combined flow of hot air provides convective heating of the upwardly facing coated glass surface of each conveyed glass sheet as previously described. Each horizontal delivery tube 112 has opposite lateral ends 122 having a heat exchanger support 124. Each heat exchanger tube 116 has inclined portions 126 extending between the upper manifold 106 and the supports 124 at the pair of opposite lateral ends 122 of the delivery tube. More specifically, each heat exchanger tube 116 includes a pair of the inclined portions 126 that extend with the inverted V shape between the upper manifold 106 and the supports 124 at the opposite lateral ends 122 of the horizontal delivery tube. The supports 124 for the heat exchanger tube 116 permit movement therebetween to account for differential heating that takes place between the heat exchanger tube and the deliver tube 112 during the operation.

The upper manifold 106 as shown in FIG. 5 includes a vertical supply tube 128 that depends downwardly from the furnace housing 16 and the upper manifold also has a horizontal supply tube 130 that extends horizontally from the vertical supply tube. Each upper manifold 106 supports three of the hot air distributors 92 as illustrated with the heat exchanger tube inlets 118 provided at the horizontal supply tube 132 for the two end distributors and with the heat exchanger inlet 118 provided by the vertical supply tube 130 at the intermediate distributor.

Figure 8:
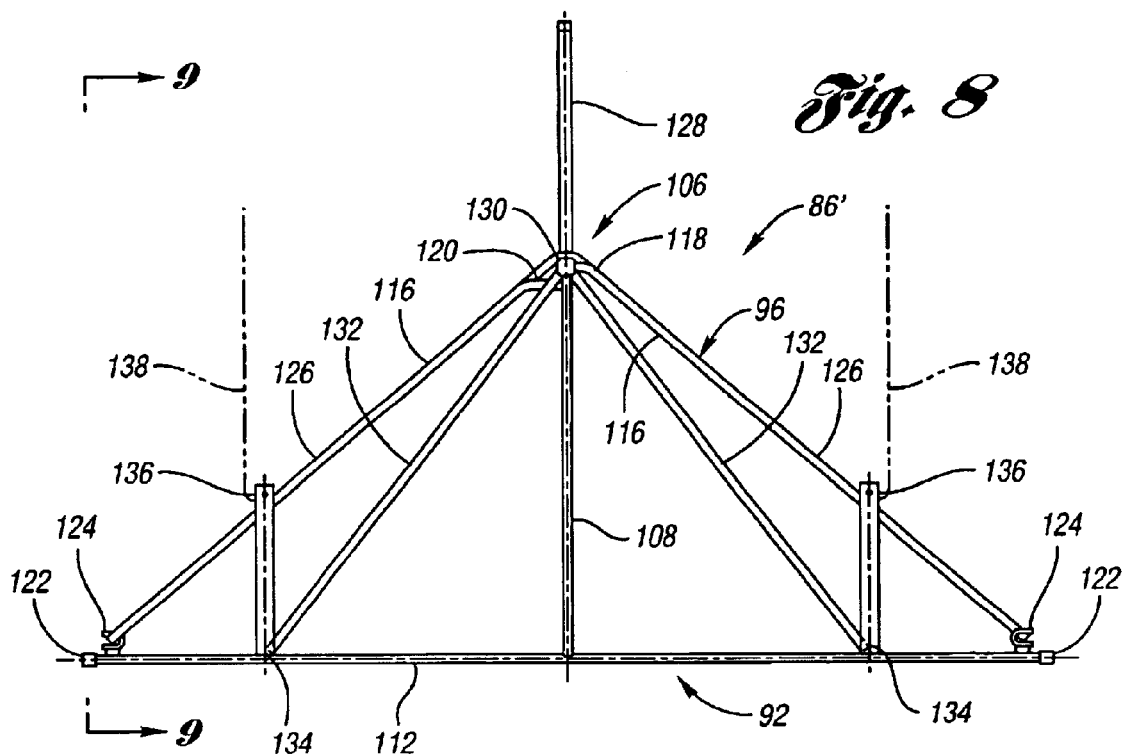
FIG. 8 is an elevational view illustrating another preferred construction of hot air distributors of the hot air distributing system.
Figure 9:
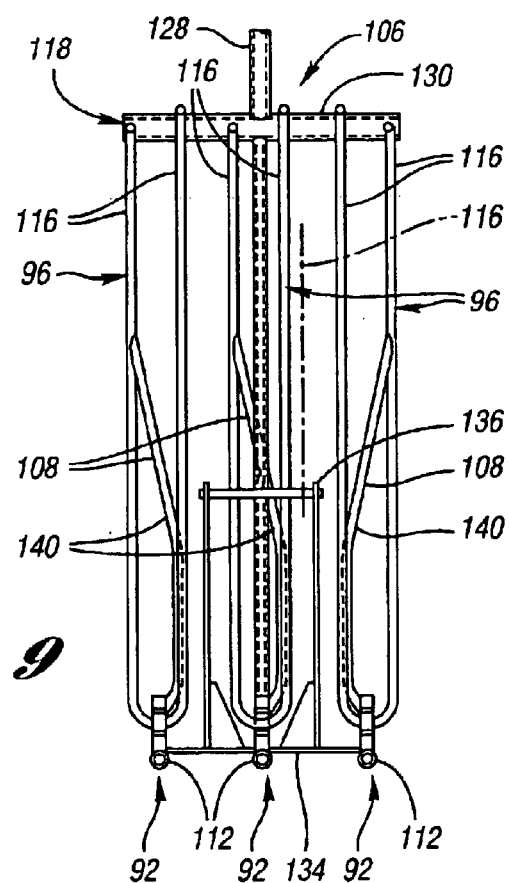
FIG. 9 is an elevational view of the hot air distributors taken along the direction of line 9—9 in FIG. 8.

With reference to FIGS. 8 and 9, another preferred embodiment of the hot air distributing system 86' has the same construction as the previously described embodiment except as will be noted such that like components thereof are identified by like reference numerals and much of the previous description is applicable and thus will not be repeated. In this embodiment of the hot air distributing system 86', each hot air distributor 92 has the fluid connections between the vertical support tube 108 and the horizontal delivery tube 112, between the heat exchanger tube 116 and the horizontal supply tube 130 and between the vertical supply tube 128 and the horizontal supply tube 130 provided by machined holes into which tube ends are inserted and then welded air tight so as to eliminate the need for fittings. Also, each hot air distributor 92 includes a pair of inclined supports 132 having upper ends connected to the manifold 106 and having lower ends connected to the horizontal delivery tube in an inverted V shape that provides support to the delivery tube. The inclined supports 132 are connected to the horizontal delivery tube 112 inwardly from its ends 122 so as to define a smaller included angle than the angle defined by the inclined portions 126 of each heat exchanger tube 116.

The hot air distributing system 86' illustrated in FIGS. 8 and 9 also includes support brackets 134 that connect adjacent hot air distributors 92 at the lower ends of their inclined supports 132. As illustrated, each bracket 132 connects three of the hot air distributors 92 which are supported by a common vertical supply tube 130 as a set. Each bracket 134 has an upper connector 136 and the furnace housing has downwardly extending roof supports 138 that support the upper connectors 136 of the brackets 134 which thereby cooperate in supporting the delivery tubes 112 of the associated hot air distributors. Each vertical support tube 108 as illustrated in FIG. 9 has a lower bent end 140 which provides space at a central location between the adjacent sets of three hot air distributors 92 for a location of thermocouples utilized for temperature sensing. To facilitate manufacturing, the central hot air distributor 92 of each set of three has its vertical support tube 108 also provided with such a lower bent end 140. Furthermore, the heat exchanger tubes 116 of each hot air distributor are all of the same construction with the two left ones illustrated in FIG. 9 oriented the same as each other and with the right one rotated 180° about a vertical axis so that the lower ends 140 provide the thermocouple space between the adjacent sets of three distributors.

Figure 10:
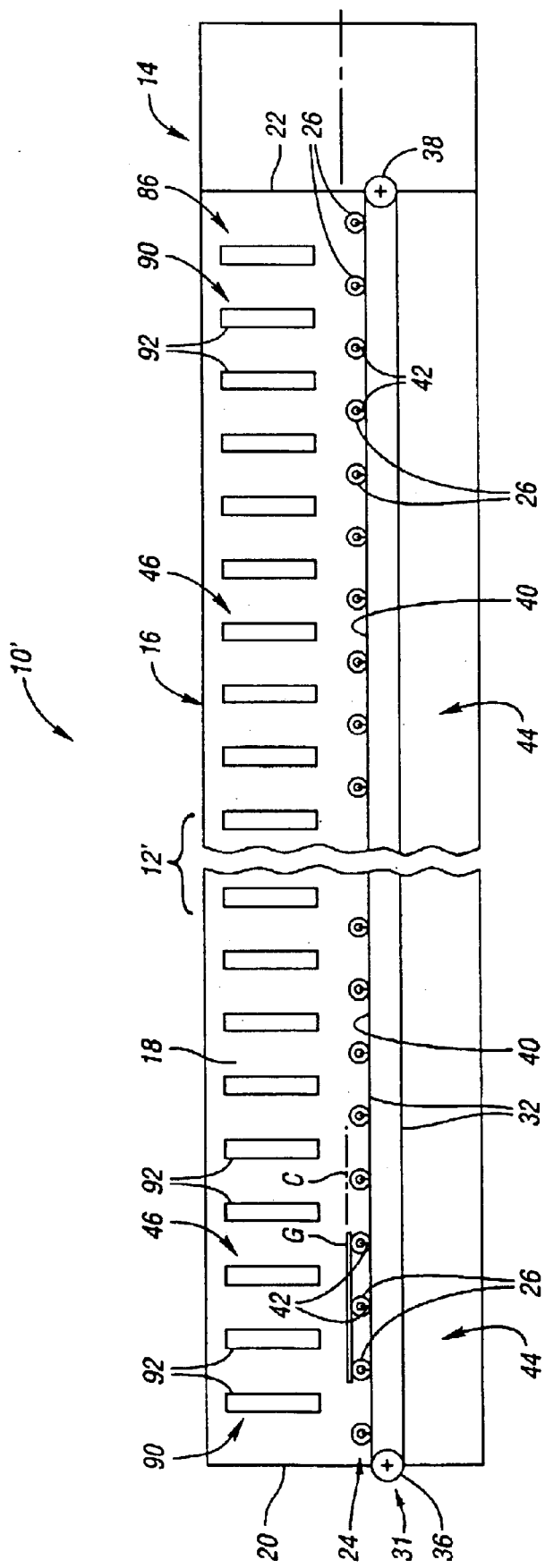
FIG. 10 is a schematic side elevational view of another embodiment of the furnace similar to FIG. 1 but having a roll conveyor that is driven in a single direction to provide continuous conveyance from the left entrance end of the furnace to its right exit end.

With the embodiment of the furnace 12 illustrated in FIG. 1, the coated glass sheets being heated are conveyed as previously mentioned in an oscillating manner between the entrance and exit ends 20 and 22 of the furnace housing. When higher production is necessary, the furnace can be of the continuous type as illustrated in FIG. 10 wherein the furnace 12' has its conveyor 24 rotatively driven in a single direction so that the coated glass sheets being heated are conveyed in a single direction from the entrance end 20 toward the exit end 22 in preparation for the processing at the processing station 14.

While the preferred embodiments for practicing the invention have been described in detail, those familiar with the art to which this invention relates will recognize various alternative designs and embodiments as defined by the following claims.

What is claimed is:

1. A furnace for heating glass sheets that each have a coated surface and an oppositely facing uncoated surface, comprising:

a housing defining a heating chamber and having entrance and exit ends;

a roll conveyor for conveying glass sheets to be heated within the heating chamber along a horizontal conveying plane between the entrance and exit ends of the housing with the coated surface facing upwardly and with the uncoated surface facing downwardly and supported by the roll conveyor;

electric resistance elements for heating the housing within the heating chamber below and above the conveying plane;

a hot air distributing system that is located within the heating chamber between the entrance and exit ends above the roll conveyor and supplies hot air jets downwardly toward the upwardly facing coated glass surface of each conveyed glass sheet, and the hot air jets entrain hot air within the heating chamber and the combined flow of hot air provides convective heating of the coated glass surface in addition to the radiant heating thereof by the electric resistance elements; and a control for increasing the forced convection heating of the glass sheet by the hot air distributing system during the glass sheet conveyance to balance the heating and the resultant temperature of the upwardly facing coated surface and the downwardly facing uncoated surface of each conveyed glass sheet being heated.

2. A glass sheet heating furnace as in claim 1 wherein hot air distributing system includes an array of hot air distributors positioned above the roll conveyor between the entrance and exit ends of the furnace, a source of pressurized air that is located outside of the furnace and supplies pressurized air to the hot air distributors, and the hot air distributors including heat exchangers for heating the pressurized air prior to delivery therefrom as the downwardly directed hot air jets.

3. A glass sheet heating furnace as in claim 2 wherein the control includes a controller for terminating the supply of pressurized air to the hot air distributors below which there is no coated glass sheet being conveyed.

4. A glass sheet heating furnace as in claim 2 wherein each hot air distributor includes an upper manifold, a vertical support tube having an upper end that is supported by the upper manifold extending downwardly therefrom without direct fluid communication therewith, the support tube having a lower end adjacent the roll conveyor, a horizontal delivery tube that extends in opposite directions from the lower end of the support tube in fluid communication therewith and has downwardly opening delivery orifices, and the heat exchanger of each hot air distributor including a heat exchanger tube having an inlet that is fed pressurized air through the upper manifold and an outlet through which pressurized air heated within the heat exchanger tube is fed to the vertical support tube for flow to the horizontal delivery tube and delivery through the orifices thereof as the downwardly directed hot air jets that entrain hot air within the heating chamber and provide convective heating to the upwardly facing coated glass surface of each conveyed glass sheet.

5. A glass sheet heating furnace as in claim 4 wherein the horizontal delivery tube has a pair of opposite lateral ends, and the heat exchanger tube having inclined portions that extend with an inverted V shape between the upper manifold and the pair of opposite lateral ends of the horizontal delivery tube.

6. A glass sheet heating furnace as in claim 5 wherein the heat exchanger tube includes a pair of inclined portions that extend with an inverted V shape between the upper manifold and the pair of opposite lateral ends of the horizontal delivery tube.

7. A glass sheet heating furnace as in claim 6 wherein the upper manifold has a vertical supply tube that depends downwardly from the furnace housing and a horizontal supply tube that extends horizontally from the vertical supply tube, and each upper manifold supporting a plurality of the hot air distributors.

8. A glass sheet heating furnace as in claim 4 wherein each hot air distributor of the hot air distribution system includes a pair of inclined supports having upper ends supported by the manifold and having lower ends connected to the horizontal delivery tube in an inverted V shape that provides support to the delivery tube.

9. A glass sheet heating furnace as in claim 8 further including support brackets that connect adjacent hot air distributors at the lower ends of their inclined supports, the brackets having upper connectors, and the furnace housing having downwardly extending roof supports that support the upper connectors of the brackets which thereby cooperate in supporting the delivery tubes of the hot air distributors.

10. A glass sheet heating furnace as in claim 1 wherein the roll conveyor includes a drive that provides rotary driving thereof in opposite directions to provide oscillation of each glass sheet being heated during conveyance thereof in opposite directions between the entrance and exit ends of the housing.

11. A glass sheet heating furnace as in claim 1 wherein the roll conveyor includes a drive that provides rotary driving thereof in one direction to provide conveyance of each glass sheet in one direction from the entrance end of the housing to its exit end.

12. A glass sheet heating furnace as in claim 1 wherein the housing includes a lower portion having a flat floor and vertical side walls having upper ends, the housing also including an upper portion of a downwardly opening semicircular shape having lower ends located above the upper ends of the vertical side walls of the lower housing portion such that the housing portions cooperate to define the heating chamber, and the electric resistance elements being mounted within the heating chamber on the lower housing portion floor below the roll conveyor and on the semicircular upper housing portion above the roll conveyor.

13. A glass sheet heating furnace as in claim 1 wherein the upper ends of the vertical walls of the lower housing portion and the lower ends of the semicircular upper housing portion cooperate to define side slots, the roll conveyor including rolls having ends that project outwardly through the side slots of the furnace housing, heat seals that seal between the lower housing vertical side wall upper ends, the semicircular upper housing lower ends and the rolls to reduce heat loss from the heating chamber, and a drive that rotatively drives the roll ends externally of the heating chamber.

14. A furnace for heating glass sheets that each have a coated surface and an oppositely facing uncoated surface, comprising:

a housing defining a heating chamber and having entrance and exit ends;

a roll conveyor for conveying glass sheets to be heated within the heating chamber along a horizontal conveying plane between the entrance and exit ends of the housing with the coated surface facing upwardly and with the uncoated surface facing downwardly and supported by the roll conveyor;

electric resistance elements for heating the housing within the heating chamber below and above the conveying plane;

a hot air distributing system including an array of hot air distributors positioned above the roll conveyor between the entrance and exit ends of the furnace, a source of pressurized air that is located outside the furnace and supplies pressurized air to the hot air distributors, the hot air distributors including heat exchangers for heating the pressurized air prior to delivery therefrom as downwardly directed hot air jets toward the upwardly facing coated glass surface of each conveyed glass sheet, and the hot air jets entrain hot air within the heating chamber and the combined flow of hot air provides convective heating of the coated glass surface in addition to the radiant heating thereof by the electric resistance elements; and a control including a controller for increasing the forced convection heating of the glass sheet by the hot air distributing system during the glass sheet conveyance to balance the heating and the resultant temperature of the upwardly facing coated surface and the downwardly facing uncoated surface of each conveyed glass sheet being heated, and the controller terminating the supply of pressurized air to the hot air distributors below which there is no coated glass sheet being conveyed.

15. A furnace for heating glass sheets that each have a coated surface and an oppositely facing uncoated surface, comprising:

a housing including a lower portion having a flat floor and vertical side walls having upper ends, the housing also including an upper portion of a downwardly opening semicircular shape having lower ends located above the upper ends of the vertical side walls of the lower housing portion such that the housing portions cooperate to define a heating chamber having entrance and exit ends;

a roll conveyor for conveying glass sheets to be heated within the heating chamber along a horizontal conveying plane between the entrance and exit ends of the housing with the coated surface facing upwardly and with the uncoated surface facing downwardly and supported by the roll conveyor;

electric resistance elements for heating the housing within the heating chamber below and above the conveying plane, the electric resistance elements being mounted on the floor of the lower housing portion below the roll conveyor and on the semicircular upper housing portion above the roll conveyor;

a hot air distributing system including an array of hot air distributors positioned above the roll conveyor between the entrance and exit ends of the furnace, a source of pressurized air that is located outside the furnace and supplies pressurized air to the hot air distributors, each hot air distributor including an upper manifold, a vertical support tube having an upper end that is supported by the upper manifold extending downwardly therefrom without direct fluid communication therewith, the support tube having a lower end adjacent the roll conveyor, a horizontal delivery tube that extends in opposite directions from the lower end of the supply tube in fluid communication therewith and has opposite lateral ends, the horizontal delivery tube having downwardly opening delivery orifices, a heat exchanger including a heat exchanger tube having an inlet that is fed pressurized air through the upper manifold and an outlet through which pressurized air heated within the heat exchanger tube is fed to the vertical support tube for flow to the horizontal delivery tube and delivery through the orifices thereof as downwardly directed hot air jets, the hot air jets entraining hot air within the heating chamber and the combined flow of hot air providing convective heating of the upwardly facing coated glass surface of each conveyed glass sheet in addition to the radiant heating thereof by the electric resistance elements, and the heat exchanger tube having inclined portions that extend with an inverted V shape between the upper manifold and the pair of opposite lateral ends of the horizontal delivery tube; and a control including a controller for increasing the forced convection heating of the glass sheet by the hot air distributing system during the glass sheet conveyance to balance the heating and the resultant temperature of the upwardly facing coated surface and the downwardly facing uncoated surface of each conveyed glass sheet being heated, and the controller terminating the supply of pressurized air to the hot air distributors below which there is no coated glass sheet being conveyed.

16. A method for heating glass sheets that each have a coated surface and an uncoated surface comprising:

conveying each glass sheet on a roll conveyor along a horizontal conveying plane within a heating chamber of a housing between entrance and exit ends thereof with the coated surface thereof facing upwardly and with the uncoated surface thereof facing downwardly;

electrically heating resistance elements located both below and above the conveying plane to provide radiant heat to both the downwardly facing uncoated surface and the upwardly facing coated surface of each conveyed glass sheet;

supplying hot air jets downwardly toward the upwardly facing coated glass surface of each conveyed glass sheet such that the hot air jets entrain hot air within the heating chamber and the combined flow of hot air provides forced convection heating of the coated glass surface in addition to the radiant heating thereof by the electric resistance elements; and increasing the forced convection heating by the downwardly directed hot air jets during the glass sheet conveyance to balance the heat supplied to and the resultant temperature of the upwardly facing coated surface and the downwardly facing uncoated surface of each conveyed glass sheet being heated.

17. A method for heating coated glass sheets as in claim 16 wherein the hot air jets are supplied downwardly through an array of hot air distributors between the entrance and exit ends of the housing with the hot air jet supply being terminated at the hot air distributors when there is no conveyed glass sheet below those distributors on the roll conveyor.

18. A method for heating coated glass sheets as in claim 16 wherein the roll conveyor is rotatively driven in opposite directions to convey the coated glass sheet in an oscillating manner between the entrance and exit ends of the housing.

19. A method for heating coated glass sheets as in claim 16 wherein the roll conveyor is rotatively driven in one direction to convey each coated glass sheet from the entrance end of the housing to its exit end.

20. A method for heating glass sheets that each have a coated surface and an uncoated surface comprising:

conveying each glass sheet on a roll conveyor along a horizontal conveying plane within a heating chamber of a housing between entrance and exit ends thereof with the coated surface thereof facing upwardly and with the uncoated surface thereof facing downwardly;

electrically heating resistance elements located both below and above the conveying plane to provide radiant heat to both the downwardly facing uncoated surface and the upwardly facing coated surface of each conveyed glass sheet;

supplying pressurized air to heat exchangers of hot air distributors located between entrance and exit ends of the housing to supply hot air jets downwardly toward the upwardly facing coated glass surface of each conveyed glass sheet such that the hot air jets entrain hot air within the heating chamber and the combined flow of hot air provides forced convection heating of the coated glass surface in addition to the radiant heating thereof by the electric resistance elements, and the hot air jet supply being terminated at the hot air distributors when there is no conveyed glass sheet below those distributors on the roll conveyor; and increasing the forced convection heating by the downwardly directed hot air jets during the glass sheet conveyance to balance the heat supplied to and the resultant temperature of the upwardly facing coated surface and the downwardly facing uncoated surface of each conveyed glass sheet being heated.

* * * * *